W. F. HIPES.
BEET HARVESTER.
APPLICATION FILED MAR. 25, 1912.
1,044,526.
Patented Nov. 19, 1912.
3 SHEETS—SHEET 2.
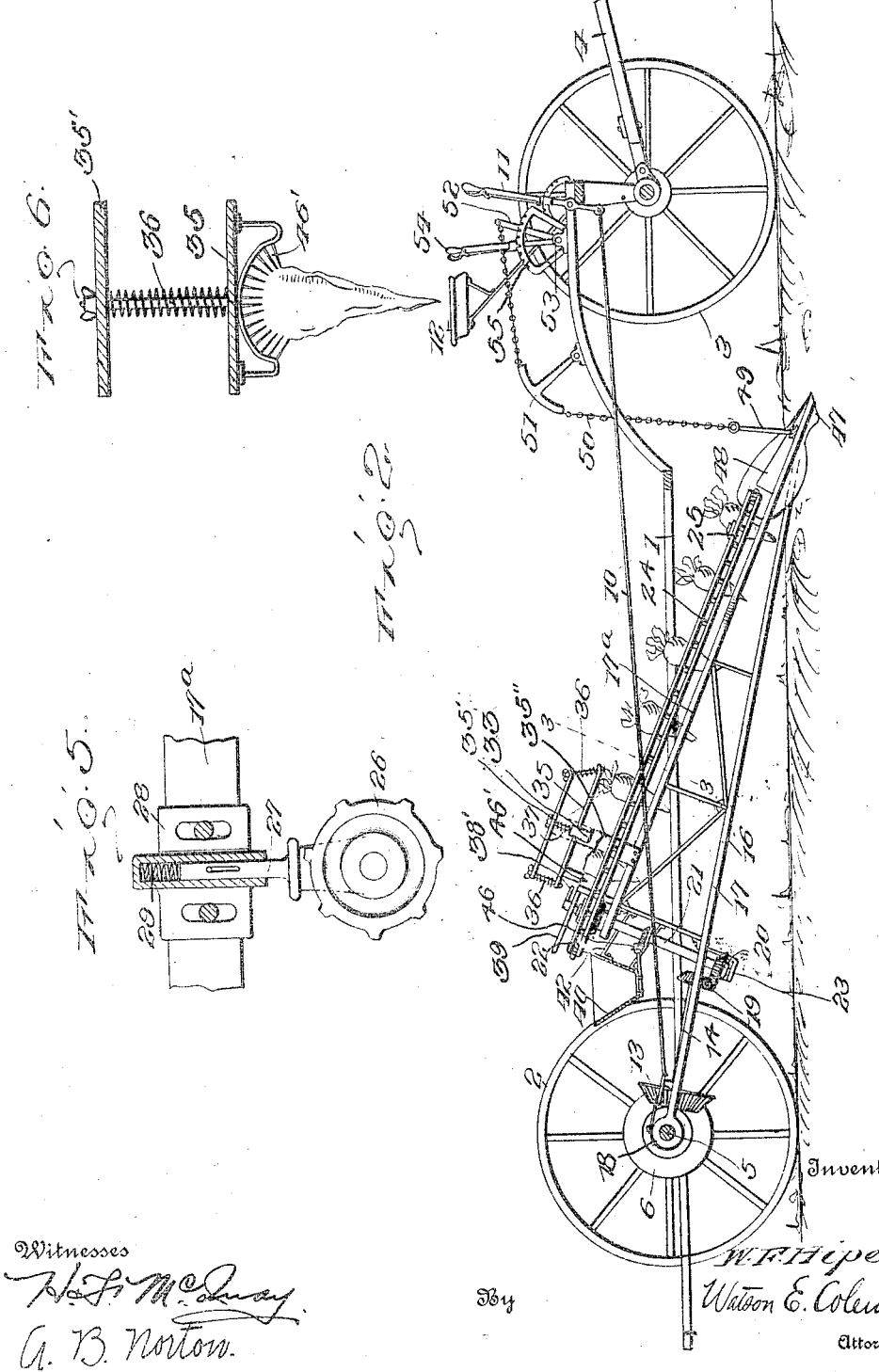
Witnesses
W. F. McQuay
A. B. Norton
Inventor
W. F. Hipes
By Watson E. Coleman
Attorney

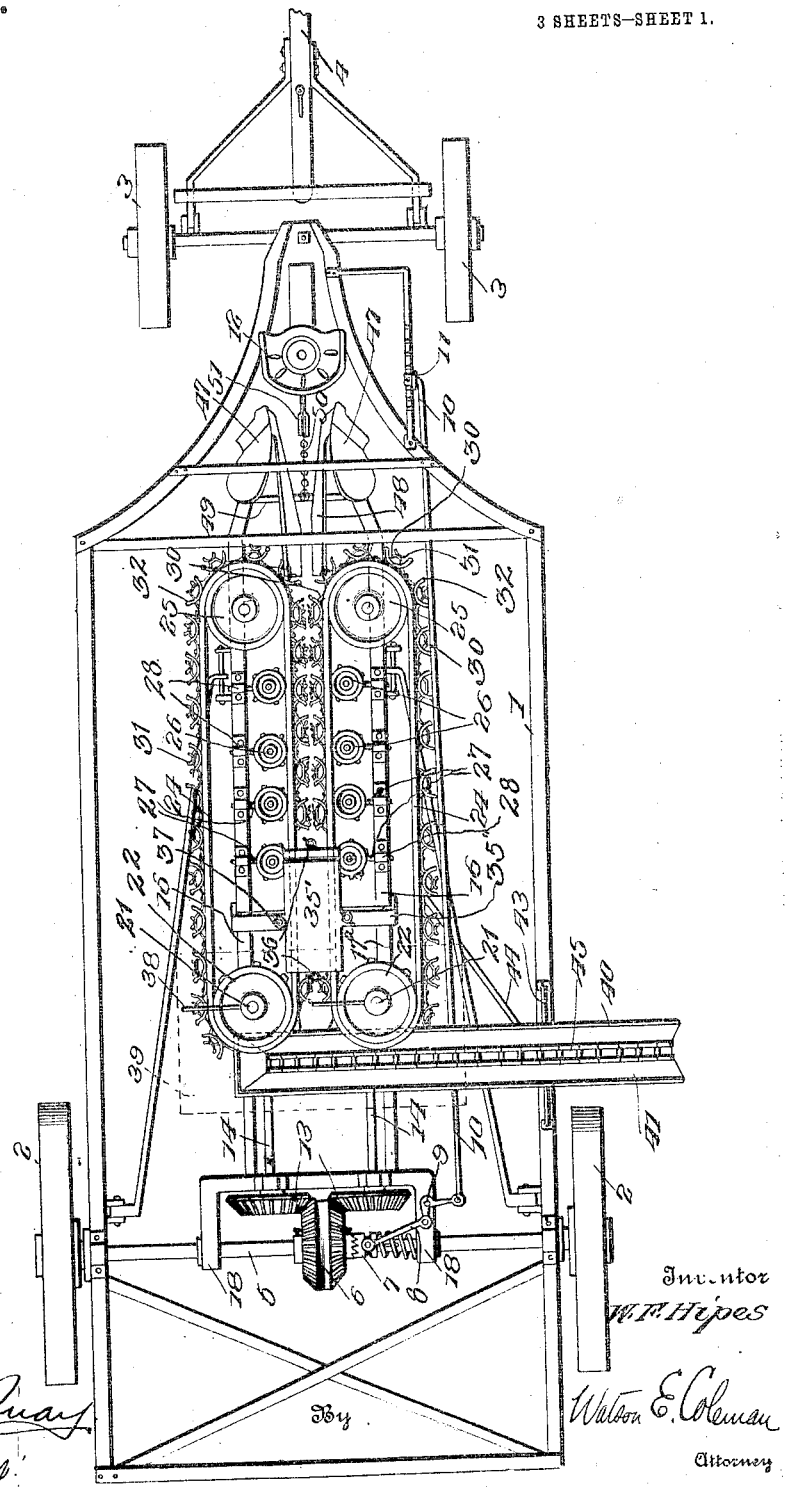

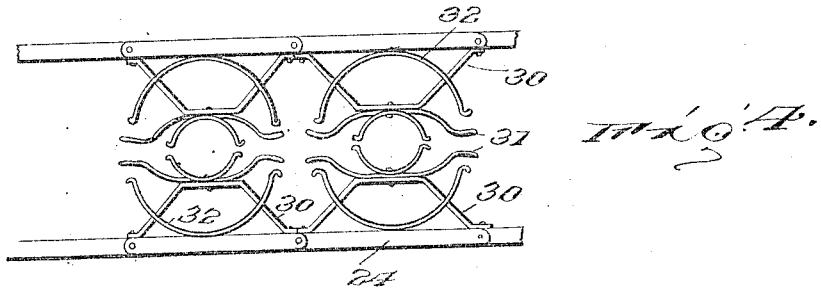
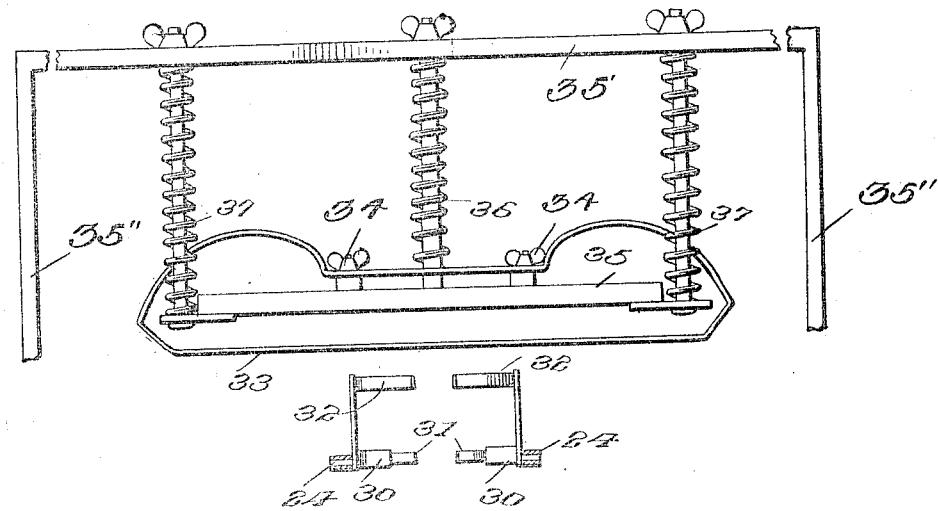

UNITED STATES PATENT OFFICE.

WILLIAM F. HIPES, OF MACDOEL, CALIFORNIA.

BEET-HARVESTER.

1,044,526.

Specification of Letters Patent. Patented Nov. 19, 1912.

Application filed March 25, 1912. Serial No. 686,135.

*To all whom it may concern:*

Be it known that I, WILLIAM F. HIPES, a citizen of the United States, residing at Macdoel, in the county of Siskiyou and State of California, have invented certain new and useful Improvements in Beet-Harvesters, of which the following is a specification, reference being had to the accompanying drawings.

This invention comprehends certain new and useful improvements in harvesting machines, and relates particularly to a machine for harvesting sugar beets, although it is to be understood that the invention is not limited to this use.

The invention has for its primary object a simple, durable and efficient construction of a machine of this character by the use of which beets or the like may effectively be removed from the soil, carried rearwardly by positively acting devices which will be sure to grasp the beets irrespective of variations in size, which will top the beets and remove the tops and other trash, and which will automatically deposit these topped beets into a laterally extending elevator from which they will be automatically deposited into a wagon or other receptacle moving alongside of the machine.

The invention also has for its object an improved harvesting machine of this type embodying an improved construction and arrangement of topping devices which will be sure in operation and capable of being adjusted so as to cut off the tops at the required points.

The invention also has for one of its objects a machine of this type in which the topping mechanism is combined with devices for automatically casting the tops or other trash from the machine and effectively separating the same from the beets.

The invention also aims to improve this class of devices and to render them more useful and commercially profitable.

With these and other objects in view which will more fully appear as the description proceeds, the invention consists in certain constructions, arrangements and combinations of the parts that I shall hereinafter fully describe and claim.

For a full understanding of the invention reference is to be had to the following description and accompanying drawing, in which:

Figure 1 is a top plan view of my beet harvesting machine. Fig. 2 is a side elevation thereof. Fig. 3 is a transverse section on the line 3—3, of Fig. 2. Fig. 4 is a top plan view of a portion of the beet holding chains. Fig. 5 is a detail view of one of the sprocket wheels employed, and, Fig. 6 is a detail perspective of a brush designed to engage the beets.

Corresponding and like parts are referred to in the following description and indicated in all of the views of the accompanying drawing by like reference characters.

Referring to the drawing, the numeral 1 indicates the main frame work of my improved beet harvesting machine, the same being supported upon rear ground or traveling wheels 2 and front ground or traveling wheels 3 to which the draft tongue or pole 4 is connected. The main frame 1 is mounted upon a rear axle 5 on which the rear ground wheels 2 are journaled by ratchet connections, whereby, when the machine is drawn forwardly the axle 5 will be rotated.

The axle 5 has secured to it, about midway of its ends, a double beveled pinion 6, which is loose on the axle, and which is designed to be coupled thereto by a spring actuated clutch member 7. The clutch member 7 is operatively connected by a link 8, to a lever which is fulcrumed on a post 9 and which is connected to a rod 10 which extends forwardly and is connected at its forward ends to a hand lever 11 fulcrumed at a point in convenient proximity to the driver's seat 12 at the front of the machine. The beveled faces of the double pinion 6 respectively engage bevel pinions 13 secured to the rear ends of longitudinally disposed shafts 14, that are mounted in a supplemental frame 16 which is triangular, longitudinally considered, embodying lower side bars 17 extending parallel to each other and journaled as at 18 on the axle 5, and upper longitudinally extending bars 17ᵃ which are connected to the lower bars 17 by braces of any desired character. The shafts 14 are provided at their forward ends with beveled pinions 19, meshing with corresponding pinions 20 secured to forwardly and upwardly extending shafts 21, provided at their upper ends with sprocket wheels 22. The shafts 21 are loosely journaled at their lower ends in stepped bearings 23.

Sprocket chains 24 extend around the sprocket wheels 22 and also around sprocket wheels 25 arranged in lateral spaced relation to each other near the front end of the supplemental tilting frame 16 and intermediate of the front pair of sprocket wheels 25 and the rear driving sprocket wheels 22. The chains 24 are engaged and held in place by any desired number of idler sprocket wheels 26. All of these sprocket wheels 26 are connected to transversely extending bars 27, that are mounted in bearings 28 secured to the upper side bars 17$^a$ and each is yieldingly held by an expansion spring 29 whereby they will at all times maintain the sprocket wheels in proper lateral spaced relation to each other while at the same time they will permit the adjoining stretches or runs of the chains as they move upwardly and rearwardly, to spread apart as required, according to the particular diameter of beet to be grasped by them. Preferably the chains 24 are so constructed that they will positively grasp the beets, the chains in the present instance embodying jointed links that are formed at their lower edges with inwardly extending brackets 30 to which springs 31 are connected, other springs 32 being secured to the links near or at the upper edges of the latter. By this means a series of spring fingers is provided which will surely grasp the beets as they are presented in between the rearwardly and upwardly moving stretches of chains, while, at the same time the hold upon the beets will not be of sufficient strength to injure them.

In order to top the beets as they are passed rearwardly and upwardly by the chains 24, I provide a transversely extending topping blade 33 which is secured by thumb nuts 34 to a longitudinally extending knife board 35 and which is preferably held at the required elevation, in spaced relation to the board 35 so that the tops of the beets may pass freely between the knife board 35 and knife 33 while the beets pass underneath the blade and are deposited into the laterally operating elevator hereinafter more specifically described. The knife board 35 is preferably curved at its ends as clearly illustrated in the drawings so it will ride up over the beets, and is yieldingly supported at its ends by spring encircled adjusting rods 36, and intermediate of its ends and at opposite sides, by corresponding adjusting rods 37. By these means the entire board, with the knife suspended from it, may be adjusted vertically as required. A knife board 35 is connected by the adjusting rods 36 and 37 to a longitudinally extending bar 35′ and the latter is in turn connected to a transversely extending bar 35″ which is supported at its angular ends on the sides of the frame 16.

Secured to the upper ends of the shafts 21 are horizontally disposed arms 38 which, in the rotation of the shaft, are designed to sweep over the upper surface of a cover plate 39, which extends over the sprocket wheels 22 and has its front edge close to the rear side of the knife 33 whereby the tops, as they pass between the knife 33 and its board 35, will be caught by these arms 38 and be swept rearwardly and fall in between the shafts 14 down upon the ground. This cover plate 39 also extends over a laterally operating elevator 40 which extends out from one side of the machine and is adapted to deposit the beets into a wagon or other receptacle drawn alongside of the harvester, movable along the fields therewith. In the present embodiment of the invention the elevator embodies a preferably sheet metal trough 41 with converging sides, said trough being rigidly connected at one end by bracing rods 42 to the supplemental frame 16 of the machine and being supported at one side of the main frame 1 on a laterally swinging bracket 43, and being connected by a pivoted brace 44 to one side bar of the frame 16. It will thus be understood that as the supplemental frame is raised or lowered the elevator 40 will be correspondingly tilted and will move inwardly or outwardly as required. The elevator also embodies a sprocket carrier 45 which is driven by a beveled pinion connection 46 from one of the shafts 21, the chain conveyer underlying the inwardly and downwardly converging side bars of the elevator and acting to carry the topped beets laterally so as to discharge them from one end of the elevator into the wagon body or the like. Preferably a wire brush 46′ is secured to the machine just below or in front of the knife board 35 and in the same manner as the knife board, being secured in place for the purpose of stripping beet leaves as the beets pass under and in contact with the bristles of the brush underneath the knife board.

At the front of the supplemental frame 16 are right and left hand plows 47 for the purpose of skimming under the earth to remove any uneven soil out of the way of the front sprocket wheels 25. On the inside of these plows and forming a land side therefor, are two pieces of metal, designated 48, the same being concave on their inner sides and tapering rearwardly so as to cause the soil and beets to be moved to the rear ends of the blades and inward and upward, raising the beets up out of the earth and causing them to stand in a ridge of soil just ahead of the conveyer chains 24. Preferably these blades 48 are rounded on their lower front corners and at that point sink deeper into the earth than the plows. The rear ends of the blades will cause the beets to lean slightly forward so that they will be in a forward position to be grasped by the conveyer chains 24.

In order to raise and lower the front end of the supplemental frame 16 so that the plows and their concomitant parts and the front conveyer sprockets 25 will be at the required elevation for efficient work, an arched bar 49 is connected to the front of the supplemental frame 16 a chain 50 being secured to said bar and passing over a rocker 51 which is mounted upon the arched forward portion of the main frame 1. The forward and upper end of the chain 50 is connected to a crank arm 52, which is secured to a shaft 53, a hand lever 54 being also secured to said shaft and designed for locking engagement with a quadrant 55.

From the foregoing description, in connection with the accompanying drawings, the operation of my improved harvesting machine will be apparent. In the practical use of the device, as the machine is drawn forwardly over the fields, the plows 47 and blades 48 will effectively take up the beets and pass them rearwardly on a narrow ridge of soil into and between the foremost conveyer sprockets 25, whereupon the beets will be caught up and held by the upwardly and rearwardly traveling sprocket chains 24 and their spring fingers and will be passed underneath the knife 33 which will top the beets, the tops passing over and upon the upper surface of the cover plate 39, being swept from the same by the revolving arms 38, while the beets will be dropped into the laterally extending elevator 40 and be deposited into a wagon body or other receptacle moving alongside of the harvesting machine.

While the accompanying drawings illustrate what I believe to be the preferred embodiment of my invention it is to be understood that the invention is not limited thereto, but that variations and changes may be made in the construction and arrangement of the parts without departing from the scope of the invention as defined in the appended claims.

I claim:

1. A harvesting machine of the character described, including plows, a frame supporting said plows, a conveyer operating on said frame, a cross bar carried by said frame above said conveyer, a longitudinally extending bar connected to the cross bar, a knife board yieldingly suspended from the longitudinally extending bar, and a knife carried by the knife board and located between the same and the conveyer.

2. A harvesting machine of the character described, including plows, a frame carrying said plows, a conveyer extending rearwardly from the plows and mounted on said frame, a longitudinally extending bar supported by and above the frame, a longitudinally disposed knife board suspended from said bar and adjustable vertically relative thereto, and a knife carried by the knife board and disposed between the same and the conveyer.

3. In a harvesting machine of the character described, the combination of conveying mechanism, topping mechanism, a cover plate adapted to receive the tops, and means for automatically sweeping the tops from the cover plate.

4. In a harvesting machine of the character described, the combination of conveying mechanism, topping mechanism, a cover plate adapted to receive the beets from the topping mechanism, and revoluble arms operated by the conveying mechanism and adapted to sweep over the upper surfaces of said cover plate for the purpose specified.

5. In a machine of the character described, the combination of conveying mechanism, topping mechanism coacting therewith, a cover plate extending rearwardly from the topping mechanism and adapted to receive the tops and to effectively discharge the same, and a laterally extending elevator at the rear of the topping mechanism and underneath the cover plate and adapted to receive the topped vegetables from the topping mechanism.

6. A harvesting machine of the character described, including topping mechanism, conveyer mechanism operating underneath the topping mechanism, a cover plate adapted to receive the beets from the topping mechanism, means including shafts for driving the conveyer mechanism, and arms secured to the upper ends of said shafts and operable thereby over the upper surface of said cover plate, whereby to sweep the tops of the beets from the latter.

In testimony whereof I hereunto affix my signature in the presence of two witnesses.

WILLIAM F. HIPES.

Witnesses:
T. J. PATTERSON,
CHARLES MESSICK.